(12) United States Patent
Kamdar

(10) Patent No.: US 10,472,560 B2
(45) Date of Patent: Nov. 12, 2019

(54) METHOD FOR TIME-CONTROLLED RELEASE OF BREAKERS BY USE OF BREAKERS ENCAPSULATED WITHIN MEMBRANES CONTAINING WATER SOLUBLE POLYMERS

(71) Applicant: Ambrish Kamdar, Sugarland, TX (US)

(72) Inventor: Ambrish Kamdar, Sugarland, TX (US)

( * ) Notice: Subject to any disclaimer, the term of this patent is extended or adjusted under 35 U.S.C. 154(b) by 0 days.

(21) Appl. No.: 15/687,940

(22) Filed: Aug. 28, 2017

(65) Prior Publication Data
US 2019/0062620 A1 Feb. 28, 2019

(51) Int. Cl.
| C09K 8/70 | (2006.01) |
| C09K 8/68 | (2006.01) |
| E21B 37/00 | (2006.01) |
| E21B 43/26 | (2006.01) |
| C09K 8/66 | (2006.01) |

(52) U.S. Cl.
CPC .............. *C09K 8/706* (2013.01); *C09K 8/665* (2013.01); *C09K 8/68* (2013.01); *E21B 37/00* (2013.01); *E21B 43/26* (2013.01)

(58) Field of Classification Search
None
See application file for complete search history.

(56) References Cited

U.S. PATENT DOCUMENTS

| 4,202,795 | A | 5/1980 | Burnham et al. |
| 4,506,734 | A | 3/1985 | Nolte |
| 4,741,401 | A | 5/1988 | Walles et al. |
| 4,770,796 | A | 9/1988 | Jacobs |
| 4,919,209 | A | 4/1990 | King |
| 5,164,099 | A | 11/1992 | Gupta |
| 5,373,901 | A * | 12/1994 | Norman .................... C09K 8/68 166/300 |
| 5,604,186 | A * | 2/1997 | Hunt ......................... C09K 8/62 166/300 |
| 6,357,527 | B1 * | 3/2002 | Norman ................. C09K 8/665 166/300 |
| 6,444,316 | B1 * | 9/2002 | Reddy ....................... B01J 13/22 427/212 |
| 2002/0160920 | A1 * | 10/2002 | Dawson ................. C09K 8/685 507/200 |
| 2004/0043906 | A1 * | 3/2004 | Heath ..................... C09K 8/536 507/200 |
| 2005/0103496 | A1 * | 5/2005 | Todd ......................... C09K 8/52 166/278 |

(Continued)

*Primary Examiner* — Anuradha Ahuja

(57) ABSTRACT

Fracturing (or fracking fluids) used to enhance hydrocarbon extraction for subterranean rock formations may impede the recovery of the targeted hydrocarbons. Thus, it is common practice to inject a breaker into the subterranean rock formation to reduce the viscosity of the fracking fluids. The chemicals used to reduce the viscosity, called breakers, need to act after the tracking fluids have opened the pores in the subterranean rock formations, but before hydrocarbon extraction is hindered. A novel method for controlling the release of the breakers is disclosed. This method comprises encapsulating the breakers within a capsule comprised of water-soluble polymers and water-insoluble polymers. The water-soluble polymers are dissolved controllably by fluids within the well, allowing the breakers to react with the fracking fluids.

39 Claims, 2 Drawing Sheets

(56) References Cited

U.S. PATENT DOCUMENTS

| | | | |
|---|---|---|---|
| 2005/0126785 A1* | 6/2005 | Todd | C09K 8/52 |
| | | | 166/307 |
| 2006/0201673 A1* | 9/2006 | Welton | C09K 8/805 |
| | | | 166/280.2 |
| 2007/0044958 A1* | 3/2007 | Rytlewski | C09K 8/68 |
| | | | 166/250.01 |
| 2010/0288495 A1* | 11/2010 | Willberg | C09K 8/80 |
| | | | 166/278 |
| 2013/0255951 A1* | 10/2013 | Little | C09K 8/706 |
| | | | 166/305.1 |
| 2014/0087974 A1* | 3/2014 | Villarreal | C09K 8/03 |
| | | | 507/110 |
| 2014/0364345 A1* | 12/2014 | Sundaram | C09K 8/805 |
| | | | 507/224 |

\* cited by examiner

METHOD FOR TIME-CONTROLLED RELEASE OF BREAKERS BY USE OF BREAKERS ENCAPSULATED WITHIN MEMBRANES CONTAINING WATER SOLUBLE POLYMERS

CROSS-REFERENCE

The present application claims the benefit of U.S. Provisional Patent Application No. 62/380,669, filed on 29 Aug. 2015, which is hereby incorporated by reference herein in its entirety, including but not limited to those portions that specifically appear herein.

FIELD OF THE INVENTION

A common practice to enhance hydrocarbon extraction from dense subterranean rock formations is to create fissures in the rock, thereby decreasing resistance to fluid flow through the formation. This can be done with a highly pressurized hydraulic fracturing fluid injected into the well. This procedure is commonly referred to as "fracking."

The hydraulic fracturing fluid is usually a viscous gel, emulsion or foam. High viscosity helps maintain the suspension of "proppants" the fluid contains. Proppants are typically very fine sand particles, and they are meant to lodge within the newly-created fissures to keep them open when the hydraulic pressure is released. Sustaining this fissure network is critical to maintaining the enhanced fluid flow through the subterranean rock.

Once the fissures are created, the hydraulic fracturing fluid's high viscosity, desirable for proppant delivery, now serves to impede potential fluid flow, thereby reducing the potential for hydrocarbon extraction. It is thus highly desirable to reduce the fracturing fluid viscosity after completing proppant placement in order to facilitate its removal. Several chemical processes, collectively known as "breaking," degrade the hydraulic fracturing fluid's underlying structural features that impart gel, emulsion or foam properties, thereby reducing the fluid's viscosity.

The time required for the diffusion of "breaking" chemical agents throughout the highly viscous fracturing fluid occupying the torturous fissure network is generally unacceptable. For this reason, breakers are usually placed in the hydraulic fracturing fluid immediately before its injection. It is evident the kinetics of the viscosity-reducing breaking process must be stringently controlled: Premature breaking will degrade proppant suspension, and hence proppant placement at fissure extrema, while overly-slow breaking is economically unacceptable due to equipment and personnel deployment costs. Incomplete breaking of the hydraulic fracturing fluid is a third undesirable outcome, which results in a persistent viscous resistance to hydrocarbon flow by the hydraulic fracturing fluid, severely attenuating well production.

The present invention is directed to a novel method for placing the breaking chemicals into semi-permeable capsules that, in turn, are dispersed in the hydraulic fracturing fluid. Such assemblies are known as "encapsulated breakers." More specifically, our method comprises placing semi-permeable capsules that contain appropriate breaking compounds in the hydraulic fracturing fluid prior to its injection into subterranean formations. Our semi-permeable capsules release breaking compounds in accordance with the manner in which they are fabricated, as we describe below.

BACKGROUND AND DESCRIPTION OF THE PRIOR ART

The type of wells that benefit most from fracking are: a) completed production wells in suitable oil and/or gas containing formations; and b) "injection wells," oil wells that have already undergone secondary or tertiary "recovery operations." Such operations involve injecting water or gas at a (preferably remote) "injection well" to drive hydrocarbon flow to the collection well. Fracking at the injection well may facilitate the transport of these fluids through the subterranean formations.

Several methods are known to moderate hydraulic fracturing fluid breaking kinetics. These methods rest upon moderating the escape of breaking chemicals from capsules that have been placed in the hydraulic fracturing fluid. No method eliminates all the problems described above.

U.S. Pat. No. 5,373,901 discloses a method of controlling the breaking of an aqueous fracturing fluid with an encapsulated breaker. The breaker described therein is encapsulated within a water-insoluble membrane that contains water-insoluble solid particles. This method teaches that when this membrane is exposed to at least one fluid to which the membrane is soluble, the embedded solid particle "imperfections" begin to exit the membrane, creating pores. The fluid can be indigenous to the subterranean formation, or in an introduced carrier fluid. As the fluid enters the capsule through the pores, the encapsulated breaker dissolves into the fluid's aqueous component, which in turn diffuses outward, beginning the breaking of the fracturing fluid gel. This method, however, leaves unwanted solid membrane-embedded particles in the fracture, which may inhibit the free flow of oil.

U.S. Pat. No. 4,202,795 discloses a pellet comprised of a solid, hydratable gelling agent encasing a chemical breaking agent. The approach taken in U.S. Pat. No. 4,202,795 is degradation of the protective gel encapsulant from within by the encapsulated breaker. Release kinetics are modulated by varying the types, and amounts, of protective hydratable gelling agents enveloping the breaker chemicals. We note that this method tends to release all of the breaking fluid at once, which may cause premature breaking U.S. Pat. No. 4,506,734 teaches a method for reducing hydraulic fracturing fluid viscosity by placing a viscosity-reducing chemical in hollow, fragile beads that may optionally be porous. When the fracturing fluid pressure is released, the newly-created fractures close to some extent, crushing the fragile beads, releasing the viscosity-reducing chemical. Breaker release depends upon the formation's closure pressure, which in turn depends upon the nature of the subterranean structure and its closure rate. This method uses a gelling agent that is hydrated forming a protective gel around said pellets for the period. When the gel breaks down the breaker is released. Thus, this method is not a controlled release, but a delayed release.

U.S. Pat. No. 4,741,401 discloses a hydraulic fracturing fluid breaking method involving the placement of a capsule comprising an enclosure member containing the breaker into the fluid injected into the subterranean formation. The enclosure member is sufficiently permeable to at least one fluid present either in the subterranean environment, or present in the hydraulic fracturing fluid. Osmotic pressure drives that fluid through the enclosure membrane, and upon sufficient fluid intake the capsule ruptures, disgorging the breaker. As with the method taught in U.S. Pat. No. 4,202, 795, this method tends to release substantially all the encapsulated breaker at one time, which is associated with premature breaking.

U.S. Pat. No. 4,770,796 teaches a method for breaking fracturing fluid compositions comprising a polymer cross-linked with titanium or zirconium crosslinking agents. An acidic breaker compound is encapsulated in a composition comprising a cellulosic material and a fatty acid and optionally, a wax. A shortcoming of this method is that insoluble cellulosic residue remains in the fractures, impeding fluid flow and could potentially damage the formation U.S. Pat. No. 4,919,209 discloses a method limited to the breaking of oil-based fracturing fluid gels, which comprises injecting a breaker capsule comprising an enclosure member enveloping a breaker into the formation. The enclosure member is sufficiently permeable to at least one fluid in the formation or the gelled oil fracturing fluid, such that the enclosure member dissolves, thereby releasing the breaker U.S. Pat. No. 5,164,099 discloses a method utilizing a polyamide membrane to encapsulate a percarbonate, perchlorate or persulfate breaker. The polyamide membrane is permeable to at least one fluid in the formation which dissolves the breaker. The breaker then diffuses through the membrane to break the fracturing fluid. The polyamide membrane is sufficiently durable that it remains intact during, and after, the breaker release, which may inhibit the free flow of hydrocarbon and injected fluids. Most preferred permeable membranes are acrylamide polymers, whereas, this is a nylon membrane. Emulsions or solutions of nylon are not readily and commercially available.

There is a need for a method for the breaking of fracturing fluids which is economical, provides controlled breaker release, minimizes damage to the hydrocarbon-bearing formation, and finally, does not create any hindrance to the flow hydrocarbon or injection fluids in the subterranean structure.

SUMMARY OF THE INVENTION

The present invention relates to a method for controllably breaking an aqueous based fracturing fluid utilized to frack subterranean formations. The method comprises placing semi-permeable capsules containing breakers into the fracking fluid, wherein the encapsulated breakers are controllably released. The semipermable capsules are sometimes referred to hereinafter as "capsules."

This method is designed to provide controlled release of the breakers in aqueous-based fracturing fluid in the broad pH range between about pH 2 and pH 12.

The semi-permeable capsule is comprised of a water-insoluble polymeric membrane that envelops water-soluble breaker compounds. The water-insoluble polymeric membranes are interlaced with a plurality of water-soluble polymer inclusions that are designed to dissolve in fluids present within the well. The water-soluble breakers contained within our water-insoluble membranes exit through these engineered voids.

The water-insoluble membranes stay substantially intact throughout the release of the breaker, and the escape rate of encapsulated breaker through voids created by the dissolution of the water-soluble polymer membrane inclusions can be modulated by controlling the water-insoluble membrane thickness and the number of water-soluble inclusion regions that are incorporated in this water-insoluble membrane.

Thicker encapsulant membranes provide longer paths to be traversed by diffusion. Distinct, but concurrent diffusion processes include: a) the external aqueous phase dissolving the water-soluble inclusions, followed by the dissolved polymer diffusing outward; b) the external aqueous phase diffusing inwards, dissolving the breaker, and finally c) the diffusion of the breaker solution outward. Increasing the number of pores leads to higher release rates in a more straightforward manner: More water-soluble inclusion regions in the capsule membrane increases the number of pores that may form, and hence a simpler relationship between pore density and breaker release rate is expected.

The novel method disclosed herein provides a means of controllably releasing breakers over a desired interval, rather than releasing all, or substantially all, of the breakers at one time.

The water-insoluble capsule membrane is capable of controlled breaker time-release into an aqueous based fluid between temperatures from 60° F. to about 300° F., and pH values between about 2 to a pH of about 12, without premature release of the breaker into the fluid.

The breaker capsules can be designed to continue to release breaker in "load water," which comprises the now-thinned hydraulic fracturing fluid and other liquids that may be present in the formation, as as they are drawn to the wellbore. This sustained breaker release provides the advantage of not only reducing the viscosity of still-viscous fracturing fluid encountered en route to the wellbore, but also releasing breaker into any so-called "filter cake". Filter cake is residue from introduced fluids and encapsulants residing in fractures not large enough to accept proppants and not exposed to significant amounts of breakers. The dissolution and removal of filter cake can significantly enhance fluid mobility in the subterranean structure.

DETAILED DESCRIPTION OF THE INVENTION

The method disclosed herein provides a novel method for breaking an aqueous linear or crosslinked fracturing fluid used in fracking by simultaneously injecting the encapsulated breaker [1] (shown in FIG. 1) with the fracturing fluid, or with a carrier fluid injected into a subterranean formation prior to, simultaneously with, or subsequent to injection of the fracturing fluid.

Preferably, the encapsulated breaker [1] will be admixed with the fracturing fluid prior to introduction of the fracturing fluid into the subterranean formation.

Alternatively, the encapsulated breaker [1] may be introduced into subterranean formations using a carrier fluid wherein the carrier fluid may substantially comprise any of the aqueous liquids utilized to form fracturing fluids.

The encapsulated breaker [1] of the present invention is made using any microencapsulation technique known to those of ordinary skill in the art, for example fluidized bed processes.

Figure 1:
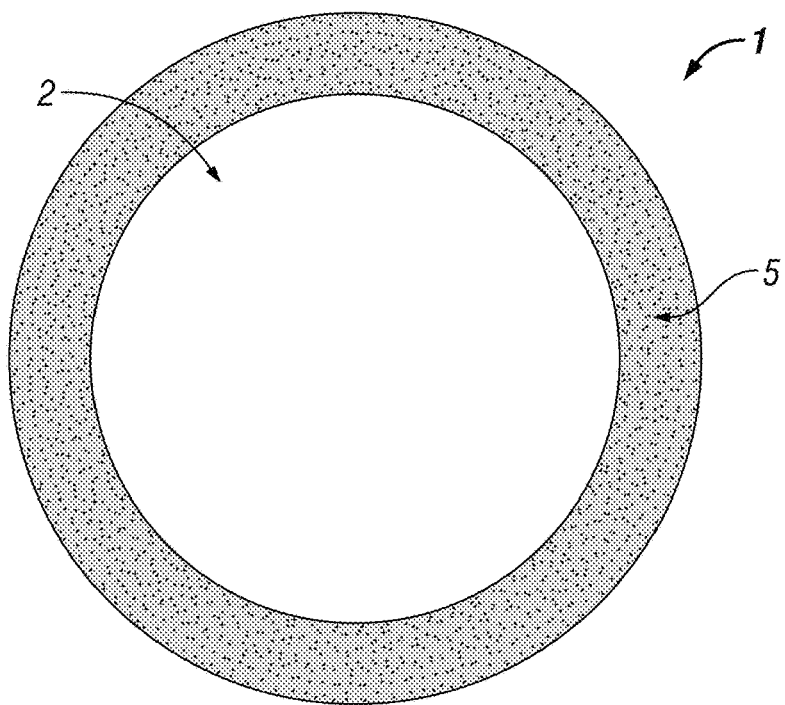
FIG. 1 depicts a diagram of the capsule.
Figure 2:
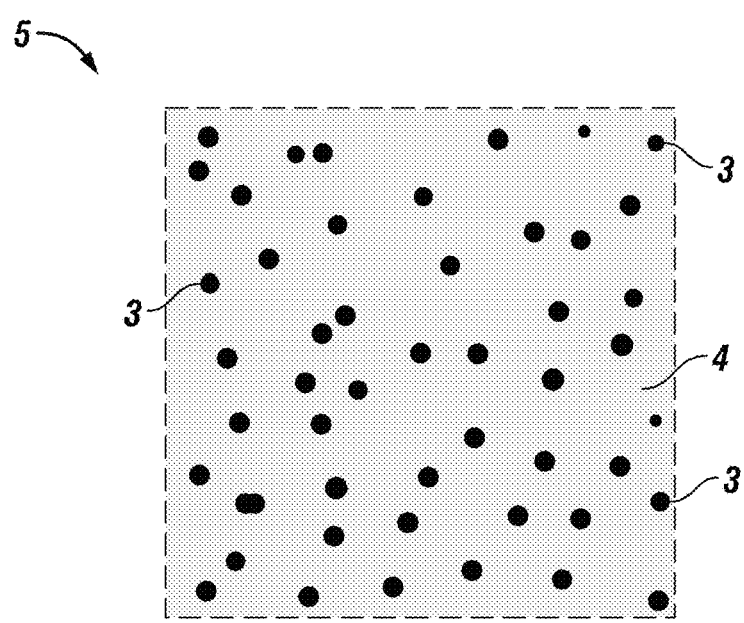
FIG. 2 depicts an exploded view of the outer wall of the capsule.

A breaker [2], which is enclosed by the encapsulant membrane [5] as shown in FIG. 1, must be a material that does not adversely interact or chemically react with the encapsulation polymer [4]. FIG. 2 is an "exploded" view of the capsule [1] outer shell [5]. The breaker [2] is selected from enzymes, such as hemicellulase; oxidizers, such as sodium persulfate, potassium persulfate or ammonium persulfate; organic acids, such as citric acid or fumaric acid; and organic acid salts, such as sodium citrate.

Breakers [2] also may include liquids adsorbed on a solid substrate, such as solid perborates, solid peroxides, and mixtures thereof, and of other solid oxidizers known to those possessing ordinary skill in the art.

The water-insoluble component [4] of the outer shell [5] of the capsule [1] comprises commercially-available, proprietary partially-hydrolyzed vinyl acrylate latex polymers, and polymers possessing crosslinking agents such as methylenebisacrylamide or, alternatively, possessing no crosslinking agents. Aqueous vesicles and micelles can be fabricated by techniques known to a person of ordinary skill in the art with the vinyl acrylate latex polymer and can be stabilized by the addition of nonionic or anionic surfactants in accordance with methods well-known in the art. The result is a mixture capable of producing water-stable suspensions of the vinyl acrylate latex polymer [4].

The vinyl acrylate latex polymers may be selected from the group comprising polyvinylchloride, polyvinylidinechloride, polyvinylidinefluoride, and acrylic esters.

The term "partially hydrolyzed acrylates" as used herein means any vinyl acrylic latex polymer containing between 0-60% by weight of an aromatic monomer, for example styrene; between 25-30% by weight alpha/beta unsaturated carboxylic acid, and between 10-95% by weight alkyl acrylate polymer or methacrylate ester polymer.

The unsaturated carboxylic acids may be selected from the group comprising acrylic acid and methyl acrylic acid, and mixtures thereof.

The alkyl acrylate or methacrylate ester may be selected from the group comprising ethylbutylacrylate, 2-ethylhexylacrylate, methylbutylacrylate, isobutyl methacrylate, and mixtures thereof.

The water-soluble graft component [3] of the capsule [1] outer shell [5] comprises mixtures of water-soluble polymers, such as polysaccharides, water-soluble homopolymers, copolymers or terpolymers, and an amine such as acrylamide, allyl amine, or vinylpyrrolidone.

The water-soluble polymers of this invention are blended with commercially-available latex polymer emulsions using techniques well-known to those possessing ordinary skill in the art. The water-soluble polymer of this invention is dissolved or slurried in water, and then added to commercially-available latex polymer that is suspended in water. The two polymers are mixed together so that the water-soluble polymer of this invention is dispersed throughout the water-soluble latex polymer suspension, resulting in a structure that contains distinct regions composed of almost wholly of water-insoluble latex polymer [4] and regions rich in the water-soluble polymers of this invention [3], as shown in FIG. 2. No significant chemical reaction occurs during the mixing process.

The mixing of the latex emulsion blend and the water-soluble polymer of this invention may be done prior to, or concurrently with the breaker encapsulation. The water-soluble polymer component of this invention may be added in solution, or as a solid. When mixing is complete, the encapsulating latex emulsion blend/water-soluble polymer mixture is dried in a fluid bed dryer.

The outer layer [5] of the capsule [1] may contain between about 0.01% and about 35% by weight of water-soluble polymer [3], and more preferably between about 0.1% and about 5% by weight of water-soluble polymer [3].

When the capsule [1] encounters water, the water dissolves the water-soluble polymer [3], leaving the water-insoluble polymer component of the structure [4] with voids. Water can enter the capsule through these voids and dissolve the breaker [2].

The capsule [1] outer layer [5] is between about 8% and about 50% of the total weight of the capsule [1]. Preferably, the outer layer [5] is between about 15% and about 35% by weight of the capsule [1]. The higher the percentage of the total weight of the capsule [1] that is contained in the outer layer [5] of the coating, the slower the release of the breaker.

In the practice of the present invention, the temperature of the formation to be treated and the desired break time of the fracturing fluid dictates the concentration of the breaker [2] to be encapsulated. The present invention accommodates a wide range of breaker concentrations currently in use, which may be from about 0.1 pound per 1,000 gallons fracturing fluid to about 50 pounds per 1,000 gallon of fracturing fluid.

Furthermore, the encapsulated breakers [2] of the present invention may be utilized in a fracturing fluid also containing unencapsulated breakers if a particularly short "break time" is required.

The desired time for the controlled release of encapsulated breakers [2] to begin is typically about 30 minutes from fracturing fluid injection, and may extend up to eight hours. This range of desired release times may be addressed by engineering the thickness and porosity, that is, the amount of water-soluble polymers incorporated within the water-insoluble polymer that encapsulates the breaker.

The capsule [1] particle size is an important consideration. Preferably, capsules [1] should be close to, or smaller than, the size of the proppant in the fracturing fluid, which is typically smaller than 10 mesh and larger than 60 mesh. Selecting this size minimizes damage to the subterranean formation that may result from introduction of the fracturing fluid into a subterranean formation. Fines or large particles impede the flow of fluids into or out from the shale, referred to as the formation damage. Capsules larger than the proppant also may be used. It is the well operators who determines the amount of breaker [2] to be released, its release rate, and finally the the size of the capsules [1], based on their desired results, the fluid being used, the subterranean temperature, and the nature of the subterranean structure.

To maintain uniform performance of breakers [2], the breaker material was sized to substantially remove particles smaller than 100 mesh, and preferably, smaller than 60 mesh. Breaker particles larger than 10 mesh, and more preferably, larger than 20 mesh, were preferred. Our narrow range of breaker particle sizes permitted uniformity in membrane coating wall thicknesses, resulting in uniform and reproducible breaker release rates.

As indicated above, the breaker release rate may be controlled by adjusting the thickness of the polymer-encapsulating membrane [5]. Thicker membranes reduce the breaker release rate since it takes longer for aqueous components of the fracturing fluid to permeate the encapsulated breaker and effect the dissolution of the breaker and subsequent outward diffusion through the coating.

As indicated above, the breaker release rate also may be controlled by the amount of water-soluble polymer [3] admixed with the water-insoluble polymer [4] residing in outer shell [5] of the capsule [1]. Preferable amounts of the water-soluble polymer [3] in the capsule [1] are between about 0.1% and 50%, more preferably between 0.5% and 20%, and even more preferably between about 1% and 10%.

A necessary feature of the capsule [1] of the novel method is that controlled release of breakers occurs without significant degradation of the water-insoluble polymeric membrane.

No solid inorganic material, for example silica, may be included as a part of the encapsulating membrane [5] as such inclusion defeats one of our invention's principal features, namely, the lack of inorganic solid residue after the breaking is complete.

The general approach to forming the capsules that were to be injected into the subterranean formation was to place about 1,000 grams of a breaker, such as ammonium persulfate (20-40 mesh), into a fluid bed dryer. Then a coating, comprising an acrylate coating agent, for example one that was manufactured by Kamsons Chemicals P L, which comprises about a 60% polymer and a water-soluble polymer, was blended with with about 0.2% to 10% of a water soluble polymer such as polyvinyl pyrillidone, then sprayed on the fluidized solids at a temperature of between about 40-45° C.

EXAMPLES

Example 1

Figure 3:
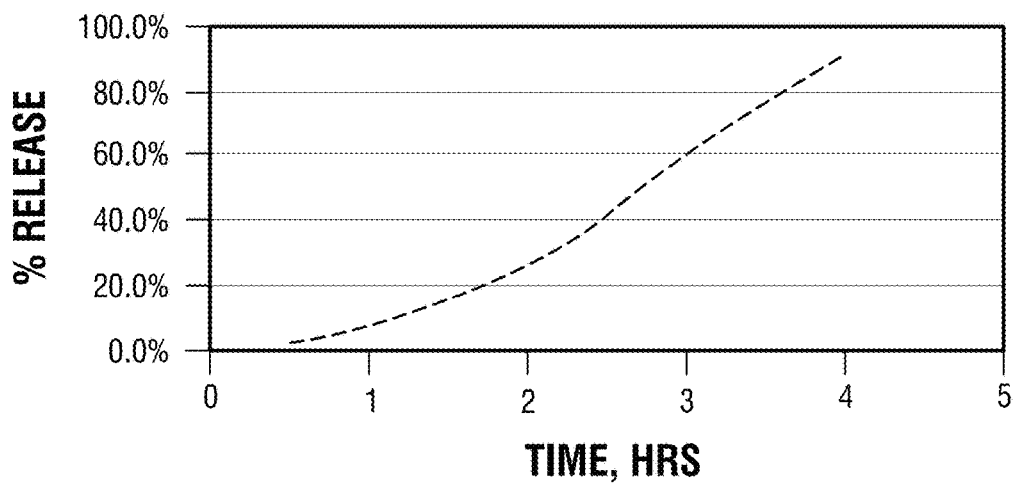
FIG. 3 shows a plot of the percentage of release of the breakers as a function of time for a capsule containing a proprietary water-insoluble polymer.

The method disclosed in U.S. Pat. No. 5,373,901 was repeated, wherein a material included additive, described therein as blends of vinyl acrylates, and an encapsulated breaker, was prepared following the general procedure described above. The coating latex was prepared by combining water, partially hydrolyzed acrylate, and a silica mixture. Three such samples were prepared. This encapsulation was then tested to determine the release profile of the sample by measuring the rate of release of encapsulated ammonium persulfate breaker at 65° C. and at atmospheric pressure. The weight percent of the coating materials (i.e., the encapsulating membrane) in the product made in this example is about 31%. The average release profile of these samples is shown in FIG. 3.

Example 2

Figure 4:
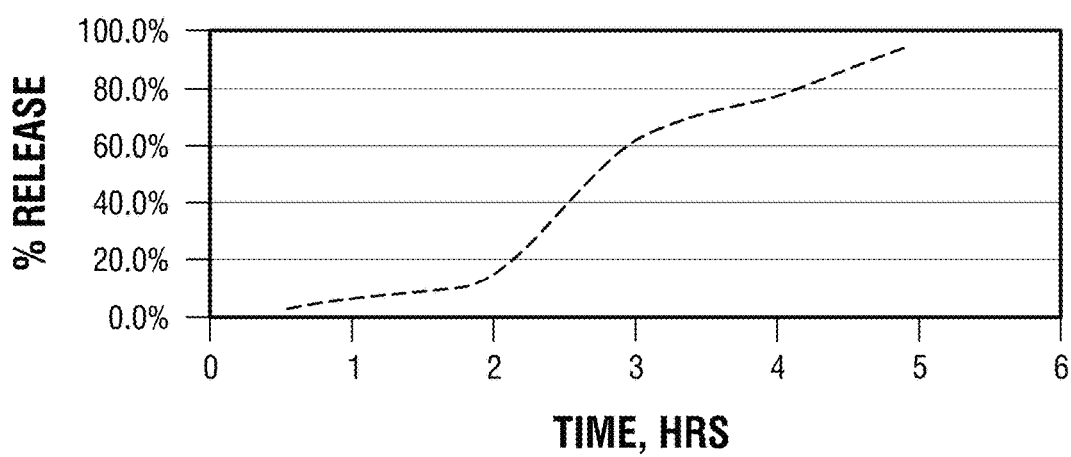
FIG. 4 shows a plot of the percentage of release of a breaker as a function of time for a capsule containing the water-soluble polymer, Polyvinyl Pyrrolidone K-90.

For comparison, a capsule, as disclosed in this application was prepared as follows: a water-soluble polymer, Polyvinyl Pyrrolidone K-90, was dissolved in water to prepare a 20% solution. 12 grams of this polymer solution was added to 528 grams of a commercial acrylate polymer emulsion, manufactured by Jonesboro, Kamson Chemicals. The resultant mixture was sprayed onto 1000 grams of ammonium persulfate at a temperature of 40-45° C. Three such samples were prepared. The weight percent of coating materials, that is, the encapsulating membrane, was about 24.2%. The concentration of the water-soluble the mixture to be sprayed was about 0.45%. The average release profile of these samples was determined. The release profile is shown in FIG. 4.

What is claimed:

1. A method for controlled breaking of an aqueous viscous fracking fluid in a subterranean formation comprising bringing together the aqueous viscous fracking fluid with at least one breaker controllably released from within a capsule;
    a) wherein the capsule comprises an outer shell and the at least one breaker, which is encapsulated within the outer shell;
    b) wherein the outer shell comprises a mixture of water-insoluble polymers and water-soluble polymers, but contains no solid inorganic material;
    c) dissolving the water-soluble polymers of the outer shell with the aqueous viscous fracking fluid, thereby creating voids in the outer shell of the capsule through which the aqueous viscous fracking fluid comes into contact with and dissolves the at least one breaker;
    d) whereafter the at least one dissolved breaker is controllably released from the capsule and diffuses outward from within the capsule; and
    e) thereafter the released at least one breaker mixes with the aqueous viscous fracking fluid, reducing the viscosity of the aqueous viscous fracking fluid, without leaving a solid inorganic residue;
    wherein the capsule, except for the voids created when the water soluble polymers are dissolved, remains intact during the release of the at least one breaker that is contained within the capsule.

2. The method of claim 1 wherein the capsule is added to the aqueous viscous fracking fluid in the subterranean formation.

3. The method of claim 2 wherein the capsule and the aqueous viscous fracking fluid are introduced into said subterranean formation separately.

4. The method of claim 1 wherein the capsule end is added to the aqueous viscous fracking fluid before the capsule and the aqueous viscous tracking fluid are introduced into the subterranean formation.

5. The method of claim 1 wherein at least one breaker that is not contained in the capsule is introduced into the subterranean formation with the capsule.

6. The method of claim 1 wherein the water-insoluble polymers of the outer shell of the capsule comprise a combination of the following polymers: partially hydrolyzed acrylate latex polymers, monovinyl aromatic monomers, unsaturated alpha carboxylic acid monomers and unsaturated beta carboxylic acid monomers.

7. The method of claim 6 wherein the partially hydrolyzed acrylate latex polymers are selected from the group consisting of polyvinylchloride, polyvinylidenechloride, polyvinylidenefluoride, acrylic ester polymers, and methacrylate ester polymers.

8. The method of claim 6 wherein the water-insoluble polymers comprise between 0.01-60% by weight of the monovinyl aromatic monomers, between 25-30% by weight of the unsaturated alpha carboxylic acid monomers and the unsaturated beta carboxylic acid monomers, and between 10-95% by weight of the partially hydrolyzed acrylate latex polymers.

9. The method of claim 6 wherein the monovinyl aromatic monomers in the capsule outer shell comprises styrene.

10. The method of claim 6 wherein the unsaturated alpha carboxylic acid monomers and the unsaturated beta carboxylic acid monomers in the capsule outer shell are selected from the group consisting of acrylic acid, methyl acrylic acid, and mixtures thereof.

11. The method of claim 1 wherein the water-insoluble polymers comprise a mixture of components, wherein the first component is selected from the group consisting of polymers of amines, acrylamides, vinyl alcohols, and vinylpyrrolidones, and the second component is selected from the group consisting of polysaccharides, homopolymers, copolymers, and terpolymers.

12. The method of claim 1 wherein the water-soluble polymers in the capsule outer shell comprise between about 0.01% and about 50% by weight of the total weight of the capsule outer shell.

13. The method of claim 1 wherein the water-soluble polymers in the capsule outer shell comprise between about 0.1% and 20% by weight of the total weight of the capsule outer shell.

14. The method of claim 1 wherein the water-soluble polymers in the capsule outer shell comprise between about 0.1% and about 5% by weight of the total weight of the capsule outer shell.

15. The method of claim 1 wherein the capsule outer shell comprises between about 8% and about 50% by weight of the total weight of the capsule.

16. The method of claim 1 wherein the capsule outer shell comprises between about 15% and about 35% by weight of the total weight of the capsule.

17. The method of claim 1 wherein the at least one breaker that is contained within the capsule is selected from the group consisting of sodium persulfate, ammonium persulfate, potassium persulfate, citric acid, fumaric acid, sodium chlorate, sodium bromate, sodium chlorite, potassium chlorate, potassium chlorite, potassium bromate, perborates, organic peroxides, organic peracids, hemicellulase enzymes, enzymes that degrade galactomannans, enzymes that degrade polyvinyl polymers, enzymes that degrade polyacrylate polymers, and combinations of members of this group.

18. The method of claim 1 wherein the aqueous viscous fracking fluid has a pH between about 2 and about 12.

19. The method of claim 1 wherein prior to encapsulation of the at least one breaker, the at least one breaker is sized to be between about 100 mesh and 10 mesh.

20. The method of claim 1 wherein prior to encapsulation of the at least one breaker, the at least one breaker is sized to be between about 60 mesh and 20 mesh.

21. A method for assisting in removing filter cake in a subterranean formation containing an aqueous viscous fracking fluid comprising:
    a) exposing the filter cake to at least one breaker controllably released from within a capsule;
    b) wherein the capsule comprises an outer shell and the at least one breaker, which is encapsulated within the outer shell;
    c) wherein the outer shell comprises a mixture of water-insoluble polymers and water-soluble polymers, but contains no solid inorganic material;
    d) dissolving the water-soluble polymers of the outer shell with the aqueous viscous fracking fluid within the subterranean formation, thereby creating voids in the outer shell of the capsule through which the aqueous viscous fracking fluid comes into contact with and dissolves the at least one breaker;
    e) whereafter the dissolved at least one breaker is controllably released from the capsule, allowing the dissolved at least one breaker to diffuse outward from within the capsule;
    f) whereafter the released at least one breaker interacts with the filter cake, thereby dissolving the filter cake;
    g) thereby facilitating removing the filter cake from the subterranean formation;
    wherein the capsule, except for the voids created when the water soluble polymers are dissolved, remains intact during the release of the at least one breaker that is contained within the capsule.

22. The method of claim 21 wherein the aqueous viscous fracking fluid is introduced into the subterranean formation together with the capsule.

23. The method of claim 21 wherein the aqueous viscous fracking fluid is introduced into said subterranean formation separately from the capsule.

24. The method of claim 21 wherein at least one breaker that is not contained in the capsule is introduced into the subterranean formation with the capsule.

25. The method of claim 21 wherein the water-insoluble polymers of the outer shell of the capsule comprise a combination of the following polymers: partially hydrolyzed acrylate latex polymers, monovinyl aromatic monomers, unsaturated alpha carboxylic acid monomers and unsaturated beta carboxylic acid monomers.

26. The method of claim 25 wherein the partially hydrolyzed acrylate latex polymers are selected from the group consisting of polyvinylchloride, polyvinylidenechloride, polyvinylidenefluoride, acrylic ester polymers, and methacrylate ester polymers.

27. The method of claim 25 wherein the water-insoluble polymers comprise between 0.01-60% by weight of the monovinyl aromatic monomers, between 25-30% by weight of the unsaturated alpha carboxylic acid monomers and the unsaturated beta carboxylic acid monomers, and between 10-95% by weight of the partially hydrolyzed acrylate latex polymers.

28. The method of claim 25 wherein the monovinyl aromatic monomer in the capsule outer shell comprises styrene.

29. The method of claim 25, wherein the unsaturated alpha carboxylic acid monomers and the unsaturated beta carboxylic acid monomers in the capsule outer shell are selected from the group consisting of acrylic acid, methyl acrylic acid, and mixtures thereof.

30. The method of claim 25 wherein the water-insoluble polymers comprise a mixture of two components, wherein the first component is selected from the group consisting polymers of amines, acrylamides, vinyl alcohols, and vinylpyrrolidones, and the second component is selected from the group consisting of polysaccharides, homopolymers, copolymers, and terpolymers.

31. The method of claim 21 wherein the water-soluble polymers in the capsule outer shell comprise between about 0.01% and about 50% by weight of the total weight of the capsule outer shell.

32. The method of claim 21 wherein the water-soluble polymers in the capsule outer shell comprise between about 0.1% and 20% by weight of the total weight of the capsule outer shell.

33. The method of claim 21 wherein the water-soluble polymers in the capsule outer shell comprise between about 0.1% and about 5% by weight of the total weight of the capsule outer shell.

34. The method of claim 21 wherein the capsule outer shell comprises between about 8% and about 50% by weight of the total weight of the capsule.

35. The method of claim 21 wherein the capsule outer shell comprises between about 15% and about 35% by weight of the total weight of the capsule.

36. The method of claim 21 wherein the at least one breaker that is contained within the capsule is selected from the group consisting of sodium persulfate, ammonium persulfate, potassium persulfate, citric acid, fumaric acid, sodium chlorate, sodium bromate, sodium chlorite, potassium chlorate, potassium, chlorite, potassium bromate, perborates, organic peroxides, organic peracids, hemicellulase enzymes, enzymes that degrade galactomannans, enzymes that degrade polyvinyls, enzymes that degrade polyacrylates, and combinations of members of this group.

37. The method of claim 21 wherein the aqueous viscous fracking fluid has a pH between about 2 and about 12.

38. The method of claim 21 wherein prior to encapsulation of the at least one breaker, the at least one breaker is sized to be between about 100 mesh and 10 mesh.

39. The method of claim 21 wherein prior to encapsulation of the at least one breaker, the at least one breaker is sized to be between about 60 mesh and 20 mesh.

* * * * *